(12) United States Patent
Shiraiwa et al.

(10) Patent No.: US 6,453,066 B1
(45) Date of Patent: *Sep. 17, 2002

(54) IMAGE PROCESSING METHOD AND IMAGE PROCESSING APPARATUS

(75) Inventors: Yoshinobu Shiraiwa, Machida; Toshiyuki Mizuno, Yokohama; Yumiko Hidaka, Inagi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/785,963

(22) Filed: Jan. 22, 1997

(30) Foreign Application Priority Data

Jan. 31, 1996 (JP) .............................. 8-015550

(51) Int. Cl.$^7$ ................................. G06K 9/00
(52) U.S. Cl. ........................ 382/162; 382/167; 382/274
(58) Field of Search ................................. 382/162, 167, 382/274; 358/516, 518

(56) References Cited

U.S. PATENT DOCUMENTS 5,414,537 A * 5/1995 Omuro et al. .............. 358/518

\* cited by examiner

*Primary Examiner*—Phuoc Tran

(57) ABSTRACT

An image processing method in which color-appearance matching of an output image to an input image is achieved regardless of ambient light. Color conversion is performed on image data representing an input image to fulfil color-appearance matching of an output image to be reproduced by an image, output device, to the input image. Color conversion is performed on the image data representing the input image obtained from the input device under a certain standard light source into image data dependent on a light source used for observation. The converted image data is further subjected to color conversion based on a reference white color determined when an observation is made. The resultant image data is output to the image output device.

16 Claims, 11 Drawing Sheets

SPECTRAL DISTRIBUTIONS OF FLUORESCENT LAMP
AS TYPICAL STANDARD LIGHT SOURCE $D_{65}$ (SOLID LINE),
STANDARD ILLUMINANT C (BROKEN LINE), AND
XENON LAMP (DOTTEL LINE)

SPECTRAL SENSITIVITY CHARACTERISTICS
FOR OBTAINING TRISTIMULUS VALUES

IMAGE PROCESSING METHOD AND IMAGE PROCESSING APPARATUS

BACKGROUND OF THE INVENTION

1. Field of the Invention

The present invention relates to an image processing apparatus for performing color correction in accordance with ambient light. The invention also relates to an image processing method for use in the above apparatus.

2. Related Background Art

Along with the widespread use of color-image products, color images are becoming easier to handle, not only in specific fields, such as computer graphics (CG) design, but also in ordinary small offices. In practice, however, color matching cannot generally be achieved between an image produced on a monitor and the resulting printed image, and it is difficult to check the colors of images on the monitor prior to printing. Attention is now focussed on a color management system directed to solving the above problem.

The color management system is constructed to target, by using a common color space, the elimination of color differences produced by different types of devices. More specifically, this system is constructed based on the idea that all of the colors represented by the same coordinates in the same color space appear alike. Accordingly, color-appearance matching is implemented with the use of this system, i.e., by expressing all of the colors in the same color space and by matching the corresponding coordinates with each other. One of the methods which are currently employed for correcting differences caused by different types of devices is to use the CIE-XYZ color space and its internal description coordinates, i.e., the XYZ tristimulus values.

The environment for observing images is now explained with reference to FIG. 11. FIG. 11 shows that an image 202, which is the same as the image of a printed article 201, is displayed on a monitor 203, and ambient light 204 used for observing the image 202 and the printed image is detected by an ambient-light sensor 206 installed on the monitor 203 or on a printer. The printed image and the image 202 displayed on the CRT are not always observed under the same ambient light, and the ambient light 204 shown in FIG. 11 varies according to environmental conditions. Further, even though the image 202 on the monitor and the printed image appear alike under a certain type of ambient light, they may look completely different with a change in the ambient light. In order to prevent this problem, the above-described color management system is employed, as illustrated in FIG. 10, to predict values (for example, the XYZ values) of each image to be observed under a certain type of ambient light, based on ambient-light information 108 obtained from a sensor 109, and to reproduce the values as faithfully as possible by using profiles 103 and 106 of each device. Thus, color-appearance matching can be achieved.

This method will now be described while referring to FIG. 10. An input image (printed article) is read with a scanner 101, and $R_1G_1B_1$ values obtained from the scanner 101 are converted into device-independent color signals $X_1Y_1Z_1$ in a scanner RGB→XYZ converter 102 with the use of the scanner profile 103 in which scanner-characteristic data is stored. The color signals $X_1Y_1Z_1$ are further converted in a signal converter 104, based on ambient-light information 108 obtained from an ambient-light detecting sensor 109, into color signals $X_2Y_2Z_2$ of the respective colors to be observed under the ambient light. Then, a monitor profile 106 is used to calculate monitor input values $R_2G_2B_2$ in an XYZ→monitor RGB converter 105.

By employing the aforedescribed method, the colors represented by the same values in the common color space should appear the same. However, it is known that a color displayed on a monitor and the color of a printed article to be observed under illumination appear different to the observer even though both of the colors are represented by the same value. In order to solve this problem, further corrections are required to achieve color-appearance matching performed by visual observations under the above-described environment.

The human eye is considered to recognize all of the colors in relation to the color white. This is further considered by taking an example in which an image displayed on a monitor and a printed article are observed under a certain type of ambient light (environment light).

In the above-described environment, there may be various types of white colors (detectable white colors), such as white colors of a monitor, illumination light, and an image illuminated with illumination light (paper white color). An observer in such an environment detects, considering all of the aforedescribed different types of white colors, a white color which is used as a reference for detecting the other colors. The observer thus observes other colors based on the reference white color. Hence, the following method is considered to match the color appearance: a reference white color is determined in the above-described environment, and the other colors of all of the images are converted based on this reference white color. As an application of the above-described method, a technique disclosed in a thesis (SPIE Publication Vol. 2170 pp170.–181.) is known. This thesis reveals a method for color-appearance matching in which a reference white color is determined based on the white color of a fluorescent lamp and the white color of a monitor under the fluorescent lamp, and color conversion is performed based on the determined reference white color to obtain color-appearance matching.

The aforedescribed method for achieving color-appearance matching by determining a reference white color and converting all of the other colors based on this white color is sufficiently effective when color rendering is high under illumination light. However, any variation in the spectral distribution of illumination light generally changes the resulting color stimulus values, and changes in the color stimulus values further vary depending on the spectral reflectance factor of a reflector. Accordingly, a sufficient degree of color-appearance matching cannot be expected merely by using the method of performing color conversion of all the colors based on a specific white color.

SUMMARY OF THE INVENTION

Accordingly, in view of the above background, it is an object of the present invention to achieve color-appearance matching of output images to input images irrespective of ambient light (observing light).

It is another object of the present invention to implement highly-precise color-appearance matching of output images to input images by performing color conversion in consideration of ambient-light characteristics, such as color rendering.

In order to achieve the above-described objects, according to one aspect of the present invention, there is provided an image processing method for performing color conversion of image data representing an input image so as to fulfil color-appearance matching of an output image to be reproduced by an image output device to said input image, the method comprising the steps of: performing color-conversion processing of image data representing an input image obtained from an input device under a certain standard light source into image data dependent on a light source used for observation; performing color-conversion processing, based on a reference white color determined when an observation is made, of the image data dependent on the light source used for observation; and outputting the image data dependent on the reference white color to the image output device.

According to another aspect of the present invention, there is provided an image processing method for performing color conversion of image data representing an input image so as to fulfil color-appearance matching of an output image to be reproduced by an image output device to the input image, the method comprising the step of performing color conversion of image data representing an input image obtained from an input device under a certain standard light source into image data produced in consideration of the characteristics of ambient light and chromatic adaptation which is performed based on a reference white color determined when an observation is made.

According to still another aspect of the present invention, there is provided an image processing apparatus for performing color conversion of image data representing an input image so as to fulfil color-appearance matching of an output image to be reproduced by an image output device to the input image, the apparatus comprising: first color-conversion means for color-converting image data representing an input image obtained from an input device under a certain standard light source into image data dependent on a light source used for observation; second color-conversion means for color-converting the image data dependent on the light source used for observation, based on a reference white color determined when an observation is made; and output means for outputting the image data dependent on the reference white color to the image output device.

According to a further aspect of the present invention, there is provided an image processing apparatus for performing color-signal conversion of image data so as to fulfil color-appearance matching between an image displayed on a monitor and a printed article, the apparatus comprising: setting means for setting the type of ambient light; storage means for storing in advance color-signal processing information on each type of the ambient light; and color-signal conversion means for performing color-signal conversion, based on the color-signal processing information corresponding to each type of the ambient light, of the image data, considering the characteristics of the ambient light and chromatic adaptation performed based on a white color of the monitor.

Further objects, features and advantages of the present invention are apparent from the following description of the preferred embodiments with reference to the attached drawings.

DESCRIPTION OF THE PREFERRED EMBODIMENTS (First Embodiment)

Figure 1:
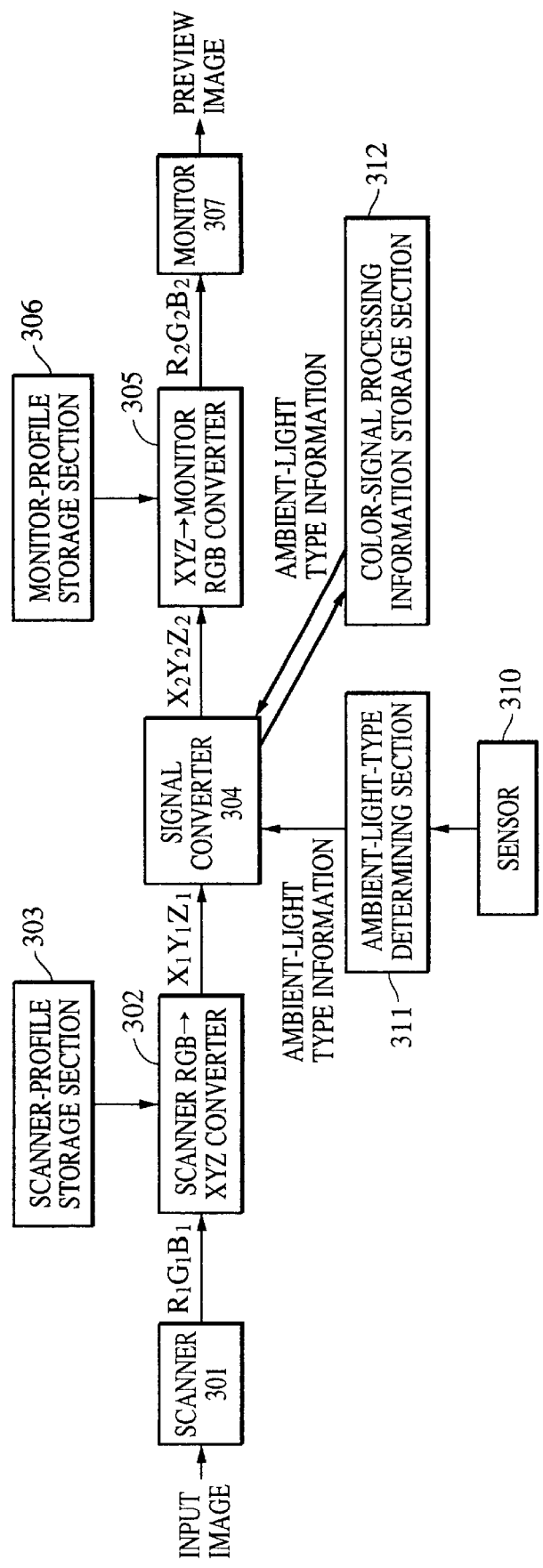
FIG. 1 is a block diagram illustrating a first embodiment of the present invention.

Referring to a block diagram illustrating the data flow in FIG. 1, a method for implementing color-appearance matching in which a printed article is read with a scanner, and a resulting image is displayed on a monitor so that it appears as the same color as the printed article.

An input image (printed article) is read by a scanner 301 and converted into an image signal. $R_1 G_1 B_1$ data read by the scanner 301 is converted into device-independent color signals $X_1 Y_1 Z_1$ in a scanner RGB→XYZ converter 302 based on the information of a scanner-profile storage section 303 in which scanner characteristics are stored. This conversion is performed on each of the RGB signals by using a look-up table, taking input gamma characteristics into account.

$$R_1' = LUT_R(R_1)$$

$$G_1' = LUT_G(G_1)$$

$$B_1' = LUT_B(B_1)$$

Then, the conversion from scanner RGB into XYZ is performed by using a 3×3-matrix $MTX_{RGB2XYZ}$.

$$\begin{bmatrix} X_1 \\ Y_1 \\ Z_1 \end{bmatrix} = MTX_{RGB2XYZ} \begin{bmatrix} R_1' \\ G_1' \\ B_1' \end{bmatrix} \quad (1)$$

The color space used in this conversion is not restricted to the XYZ color space. Any color space which compensates for differences in devices may be used (for example, the CIELUV or CIELAB color space).

The scanner-profile storage section 303 stores data representing color characteristics of the scanner 301 (the above-described color conversion matrix (RGB→XYZ) and LUT).

The resulting $X_1 Y_1 Z_1$ signals are further processed in a signal converter 304 by reading from a color-signal processing information storage section 312 color-signal processing information (more specifically, a 3×3-two-dimensional matrix XYZ12XYZ2) corresponding to the type of ambient light obtained in an ambient-light-type determining section 311 based on ambient-light information obtained by a sensor 310. The processed $X_1 Y_1 Z_1$ signals are then converted into $X_2 Y_2 Z_2$ signals with a view to fulfilling color-appearance matching between a printed article and the image displayed on the monitor under the image-observing environment.

Figure 4:
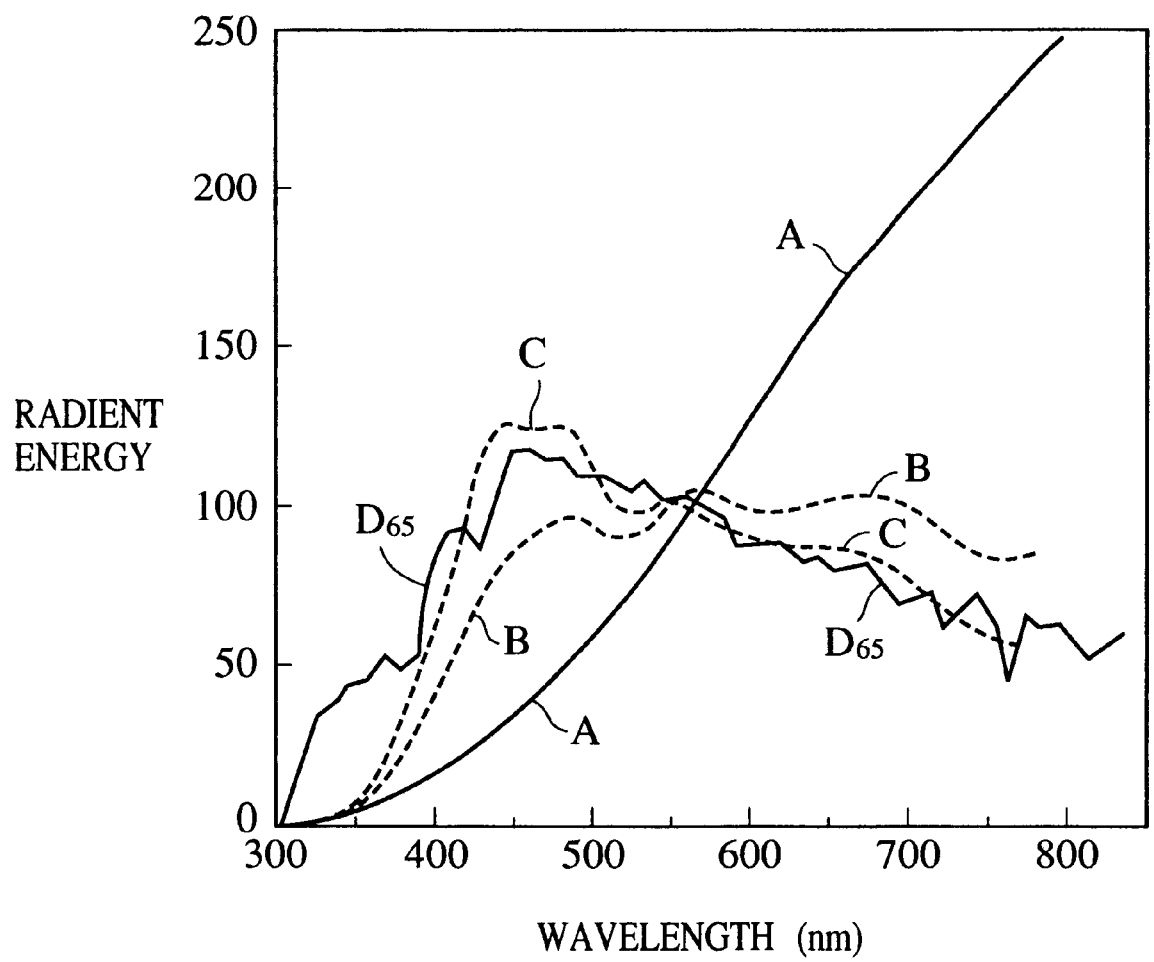
FIG. 4 illustrates the spectral distributions of a CIE standard illuminance (A, C, D65) and a supplementary standard illuminance (B) used as examples of ambient light.
Figure 5:
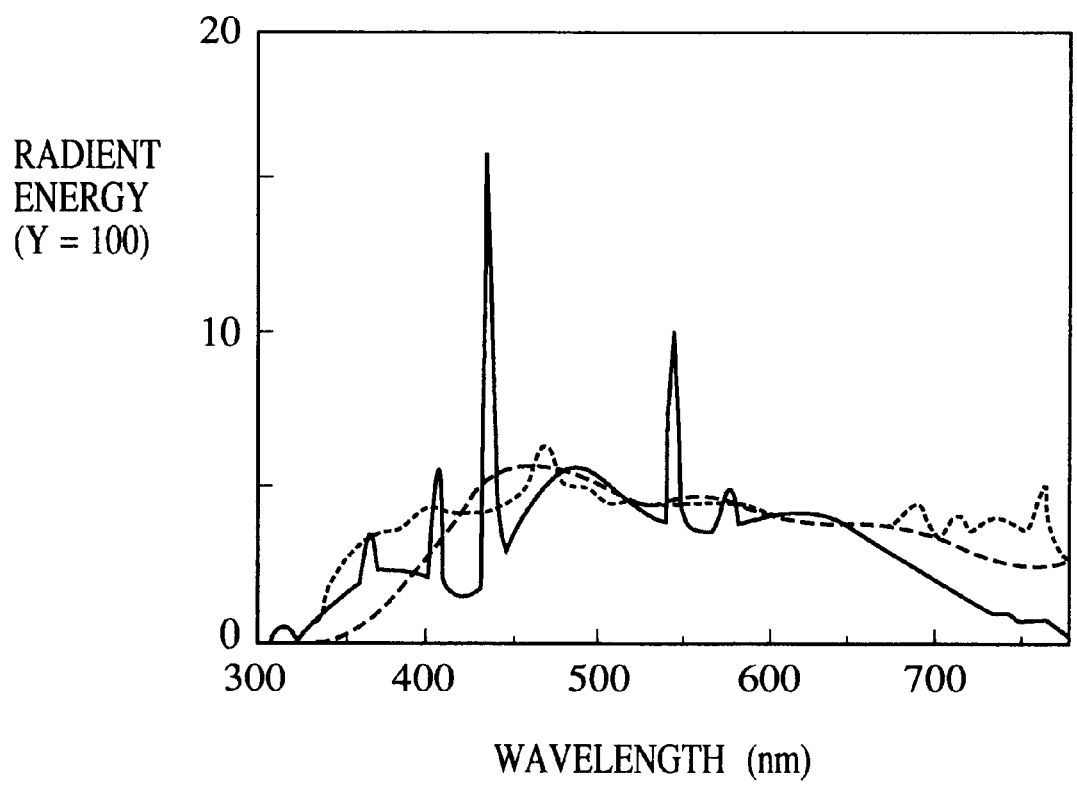
FIG. 5 illustrates the spectral distributions of a fluorescent lamp used as a typical standard light source D65, standard illuminance C, and a xenon lamp.

FIG. 4 illustrates the spectral distributions of CIE standard illuminant (A, C, D65) and supplementary standard illuminant B as ambient light. By virtue of different color temperatures of the above light sources, the type of the light sources is determined by measuring their color temperatures as ambient-light information. FIG. 5 illustrates the spectral distributions of a fluorescent lamp used as a typical standard illuminant D65, standard illuminant C and a xenon lamp. Color temperatures are not used for determining the types of the above-noted light sources. Thus, a sensor having a sensitivity in a range of a waveform of 700 nm or longer is employed to compare the intensity levels of the light sources in this range, thereby determining their type. Alternatively, the type of light sources may be determined by using a sensor having sensitivity in a very narrow range, including the bright-line of a fluorescent lamp, and comparing the intensity levels of the light sources in this range. The method for determining types of different light sources is suitably selected depending on the spectral distributions of the light sources.

The aforedescribed color-signal processing information is determined in relation to a plurality of types of ambient light by a below-described method, and a plurality of types of processing information are stored in the color-signal processing information storage section 312. The signal converter 304 executes conversion expressed by the following equations based on the matrix XYZ12XYZ2 stored in the color-signal processing information storage section 312.

$$\begin{bmatrix} X_2 \\ Y_2 \\ Z_2 \end{bmatrix} = XYZ12XYZ2 \begin{bmatrix} X_1 \\ Y_1 \\ Z_1 \end{bmatrix} \quad (2)$$

$$XYZ12XYZ2 = \begin{bmatrix} a_{11} & a_{12} & a_{13} \\ a_{21} & a_{22} & a_{23} \\ a_{31} & a_{32} & a_{33} \end{bmatrix}$$

The above matrix XYZ12XYZ2 is used for executing color-signal processing in accordance with the type of ambient light.

A monitor-profile storage section 306 stores data representing color characteristics of a monitor 307, such as the color temperature, the luminance, the chromaticity of a fluorescent material, and information indicating color conversion from a standard color space into a device-dependent color signal.

Subsequently, the monitor-device-independent $X_2Y_2Z_2$ signals obtained in the signal converter 304 are converted, based on the monitor-characteristic information stored in the monitor-profile storage section 306, into device-dependent $R_2G_2B_2$ signals in the XYZ→monitor RGB converter 305. This conversion is started by executing XYZ→monitor RGB conversion with the use of a 3×3-matrix $MTX_{XYZ2RGB}$.

$$\begin{bmatrix} R'_2 \\ G'_2 \\ B'_2 \end{bmatrix} = MTX_{XYZ2RGB} \begin{bmatrix} X_2 \\ Y_2 \\ Z_2 \end{bmatrix} \quad (3)$$

Then, look-up table conversion is performed on each of the RGB signals in consideration of monitor-output gamma characteristics.

$R_2 = LUT_R(R_2')$ $G_2 = LUT_G(G_2')$ $B_2 = LUT_B(B_2')$

The 3×3-matrix $MTX_{XYZ2RGB}$ and the monitor-output gamma characteristics are stored in the monitor-profile storage section 306 as the information concerning color conversion from a standard color space into device-dependent color signals. Thereafter, the $R_2G_2B_2$ signals are sent to the monitor 307, and an image associated with the signals is displayed on the monitor screen.

According to the above-described procedure, under the above-described image-observing environment, an image of a printed article is displayed on the monitor 307 in a color similar to that of a resultant printed article.

An explanation is now given for forming a color-signal conversion matrix XYZ12XYZ2, when an image is observed, for example, under a certain type of illumination light (environment light), as color-signal processing information corresponding to the illumination light. The matrix XYZ12XYZ2 is found by operation of the following equations.

$$XYZ12XYZ2 = M^{-1} \cdot D \cdot M \cdot CR \quad (4)$$

$$D = \begin{bmatrix} \frac{R_w}{R_{wI}} & 0 & 0 \\ 0 & \frac{G_w}{G_{wI}} & 0 \\ 0 & 0 & \frac{B_w}{B_{wI}} \end{bmatrix}$$

$$\begin{bmatrix} R_{wI} \\ G_{wI} \\ B_{wI} \end{bmatrix} = M \begin{bmatrix} X_{wI} \\ Y_{wI} \\ Z_{wI} \end{bmatrix}$$

$$\begin{bmatrix} R_w \\ G_w \\ B_w \end{bmatrix} = M \begin{bmatrix} X_w \\ Y_w \\ Z_w \end{bmatrix}$$

The above matrix M is used to convert the tristimulus values XYZ expressed by the CIEXYZ colorimetric system into the response values RGB corresponding to the level of the receptor (cones) of the human eye (see *Foundations of Color Engineering* p. 216, Asakura Shoten). $X_{W1}Y_{W1}Z_{W1}$ indicate the tristimulus values of ambient light (white color under image-observing environment). $X_WY_WZ_W$, which represent the tristimulus values of the reference white, are found with the use of the tristimulus values $X_{W1}Y_{W1}Z_{W1}$ of the ambient light (white color under image-observing environment) and the tristimulus values $X_{W2}Y_{W2}Z_{W2}$ of the monitor according to the following equations:

$X_W = (1-s) \cdot X_{W1} + s \cdot X_{W2}$ $Y_W = (1-s) \cdot Y_{W1} + s \cdot Y_{W2}$ $Z_W = (1-s) \cdot Z_{W1} + s \cdot Z_{W2}$ where $X_WY_WZ_W$ designate the tristimulus values of a white color used to observe an image displayed on the monitor 307. When an image displayed on the monitor screen is observed, the human eye is not completely adapted to the white color of the monitor, but become adapted thereto depending on the ratio of the white color of the monitor to the white color of the ambient light. Thus, the adaptation of the human eye to the monitor white color, i.e., parameters (adaptation ratio) representing an influence of the monitor white color upon the reference white in relation to the environment white color, are designated by s. The tristimulus values $X_WY_WZ_W$ of the reference white are determined by the above-described equations.

The adaptation ratio s varies depending on the color temperature of ambient light and the background color of an image (background color of a monitor). If, for example, the background color changes from black to white with the gray scale level, the background color closest to the black color has a higher adaptation ratio to the ambient light. The tristimulus values of the ambient light and the tristimulus values of the monitor white color are measured with a calorimeter, such as a color-luminance meter.

The matrix CR functions to convert color signals ($X_1Y_1Z_1$) indicated with the use of a standard color space (a standard light source D65 or D50 used in a standard color space) into color signals ($X_1'Y_1'Z_1'$) obtained in consideration of the characteristics (spectral characteristics, color rendering, etc.) of a light source (ambient light) used when an observation is made. A 3×3 matrix is used as the matrix CR. The color signals ($X_1'Y_1'Z_1'$) achieved taking the characteristics of the light source into account using the matrix CR are obtained from the color signals ($X_1Y_1Z_1$) expressed in the standard color space according to the following equation.

$$\begin{bmatrix} X_1' \\ Y_1' \\ Z_1' \end{bmatrix} = CR \begin{bmatrix} X_1 \\ Y_1 \\ Z_1 \end{bmatrix} \quad (5)$$

Figure 2:
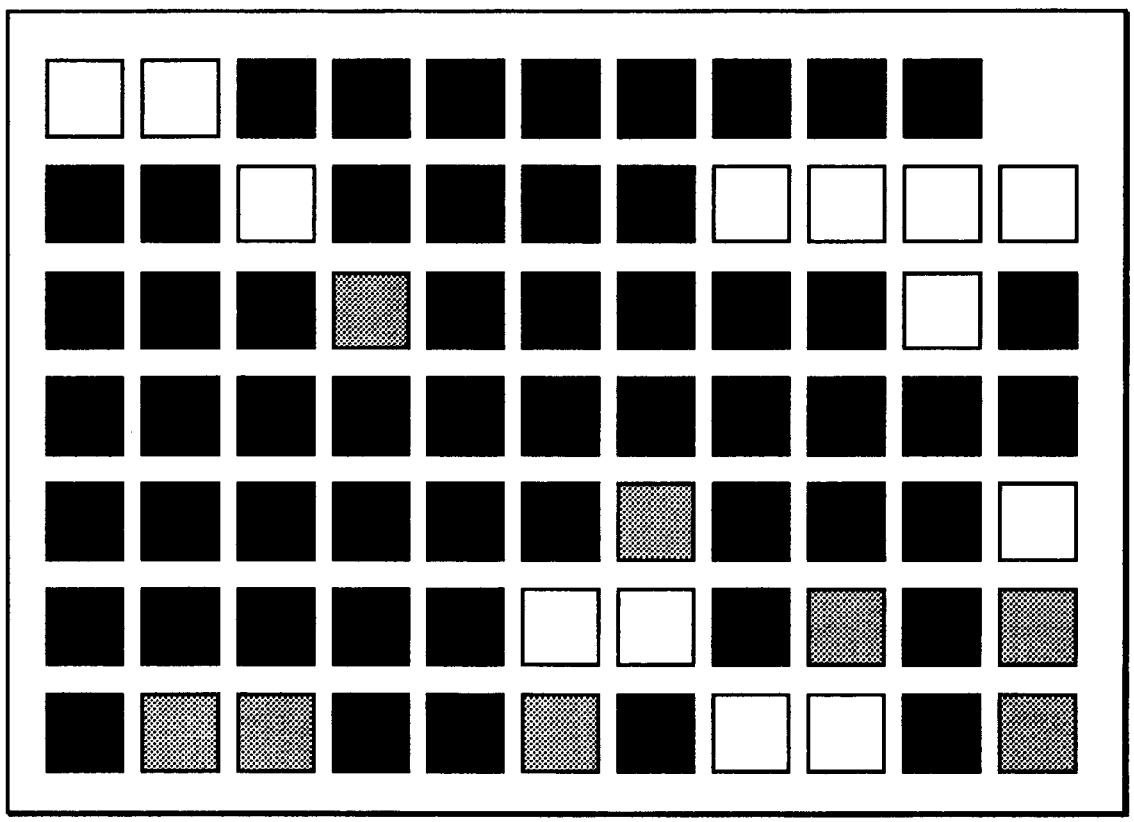
FIG. 2 illustrates a 77-color-patch test chart used for obtaining the coefficients of a matrix CR described in the first embodiment.

The actual coefficients of the matrix CR are determined, based on data representing the measurements of the tristimulus values under a certain type of illumination light and the color signals (the tristimulus values) expressed with the standard color space, by optimizing the coefficients according to the damped least squares method using a test chart formed of 77-color patches, as shown in FIG. 2. Alternatively, the tristimulus values under illumination light may be determined based on the spectral reflectance factor of the 77-color patches measured with a spectrophotometer and the spectral intensity distribution of the illumination light measured with a spectral luminance meter. Then, the actual coefficients of the matrix CR may be obtained according to the optimization method in a manner similar to the above method. The above-described measurement means are suitably selected as required.

Figure 9:
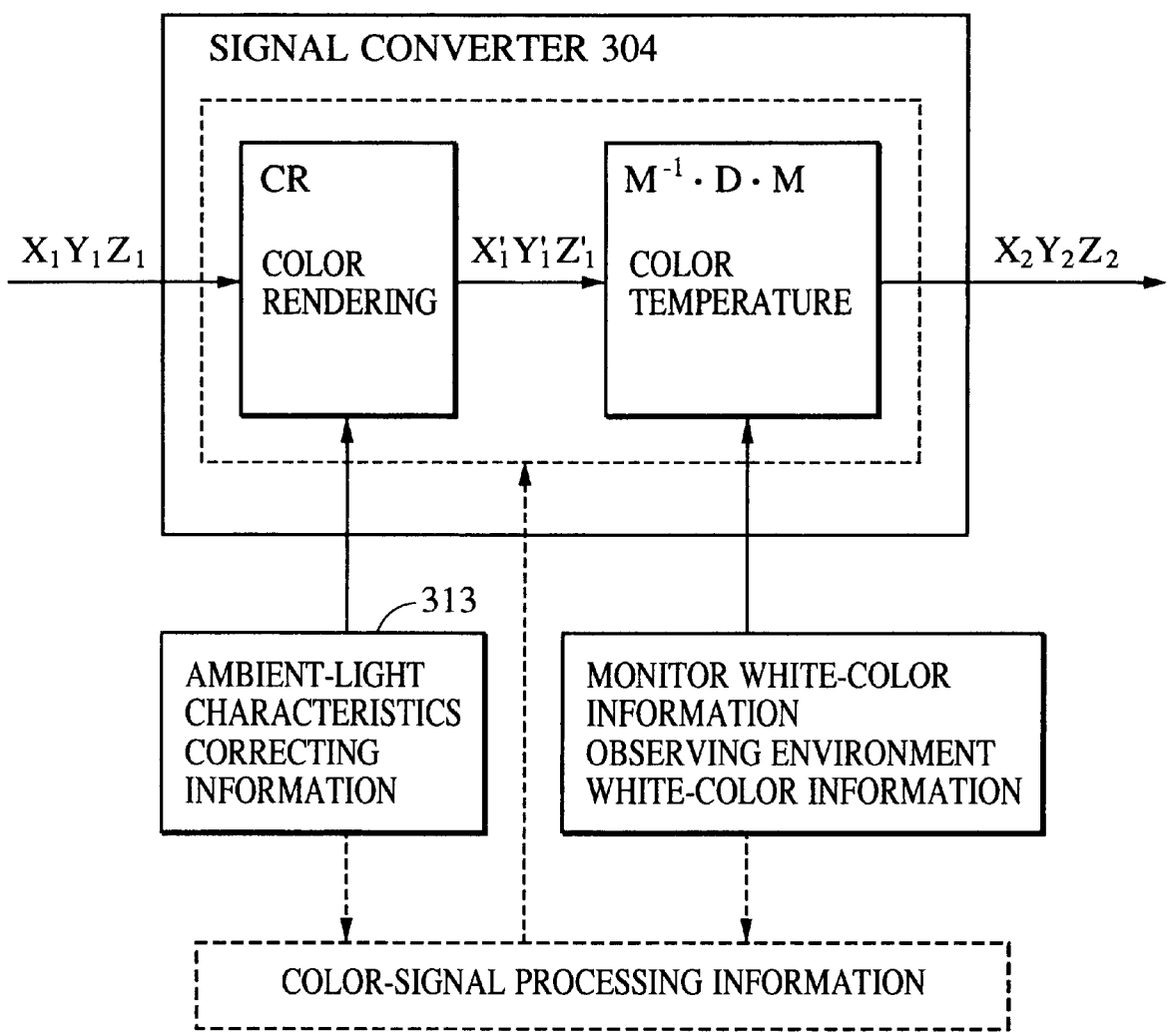
FIG. 9 is a block diagram illustrating the flow of data in the signal converter 304 of FIG. 8.
Figure 10:
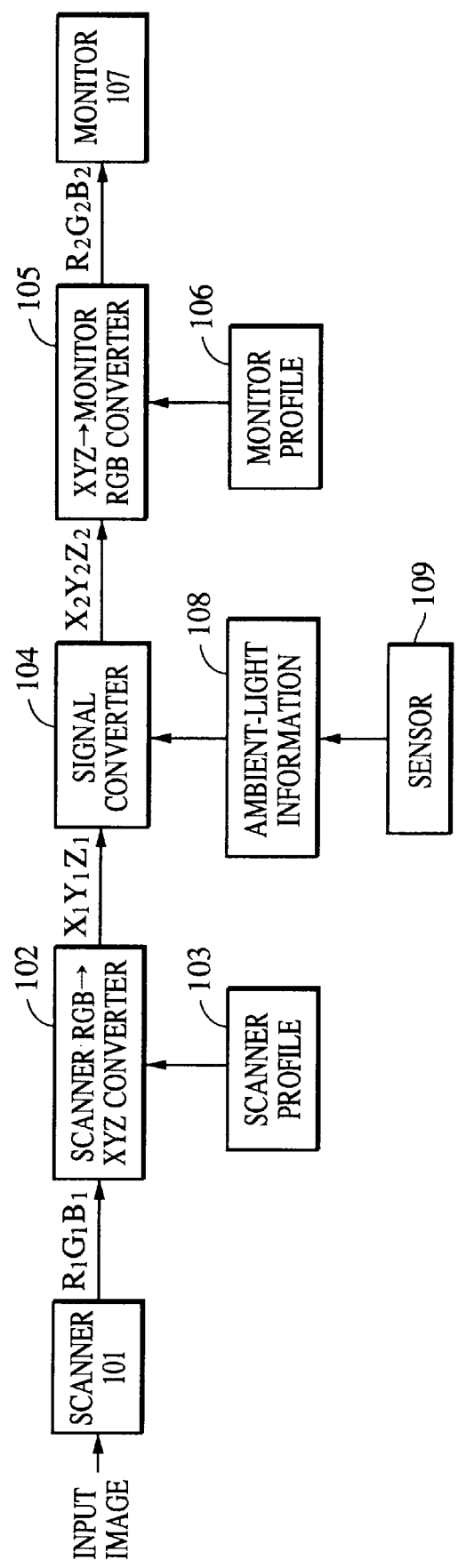
FIG. 10 is a block diagram of an example of conventional signal processing apparatuses.
Figure 11:
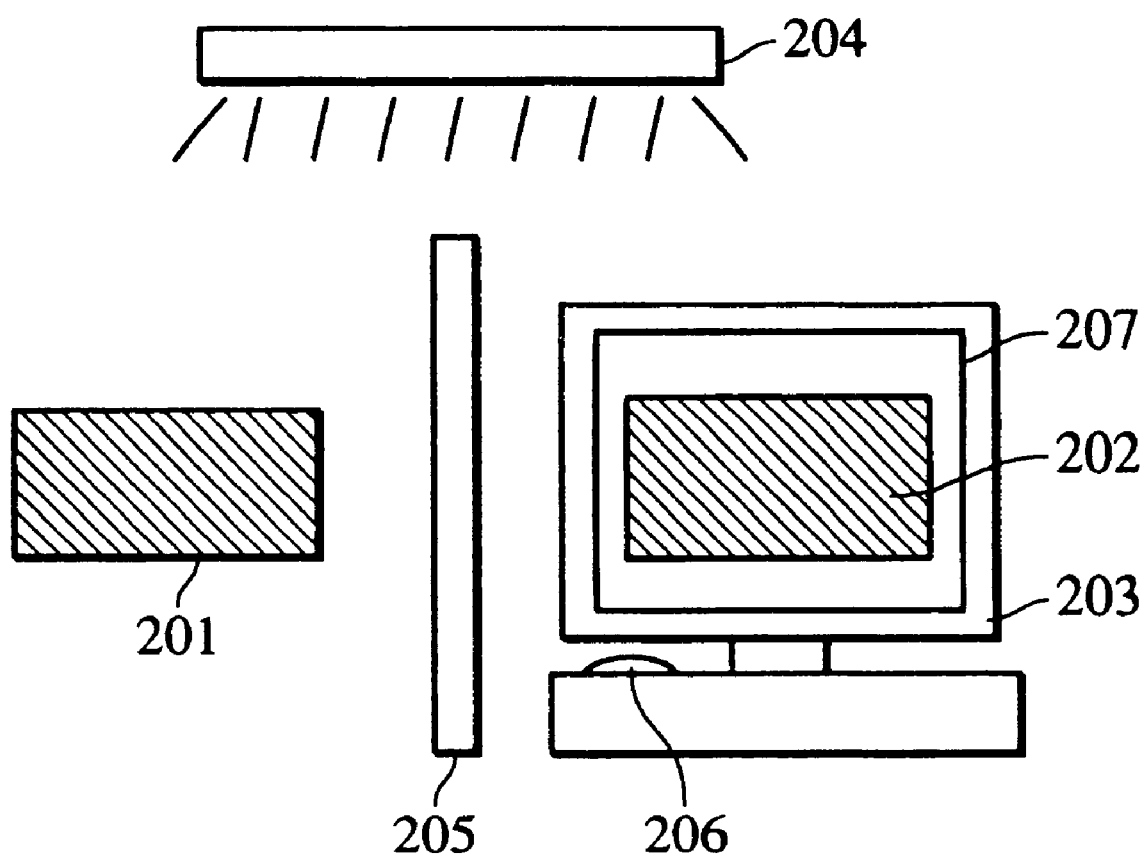
FIG. 11 illustrates an environment in which an image is observed.

Conceptually, the matrix XYZ12XYZ2 is formed of, as illustrated in FIG. 9, two factors, such as the matrix CR and the matrix $M^{-1}\cdot D\cdot M$. The matrix CR is, as discussed above, used for converting the color signals ($X_1Y_1Z_1$) expressed with a standard color space dependent on a standard light source, i.e, a scanner, into the color signals ($X_1'Y_1'Z_1'$) obtained considering the characteristics of ambient light. Namely, the matrix CR functions to convert, based on the characteristics of a light source, such as color rendering, the $X_1Y_1Z_1$ signals dependent upon a standard light source into the $X_1'Y_1'Z_1'$ signals dependent upon ambient light. The other factor, i.e., the matrix $M^{-1}\cdot D\cdot M$, serves to convert, based on the theory of Von Kreis, i.e., the chromatic-adaptation prediction theory, the ambient-light dependent signals $X_1'Y_1'Z_1'$ into reference-white dependent signals $X_2Y_2Z_2$.

In this manner, conversion is first performed based on the characteristics of ambient light, and then, chromatic adaptation is predicted based on the image-observing environment white and the reference white. Thus, highly-precise signal conversion is performed considering the characteristics of ambient light (spectral characteristics, color rendering, etc.) and the chromatic adaptation of the human eye (an influence produced upon the reference white of a monitor image by both the white color of the monitor and the white color of ambient light). As a consequence, color-appearance matching between an input image and an image displayed on the monitor 307 is achieved.

(Second Embodiment)

Figure 3:
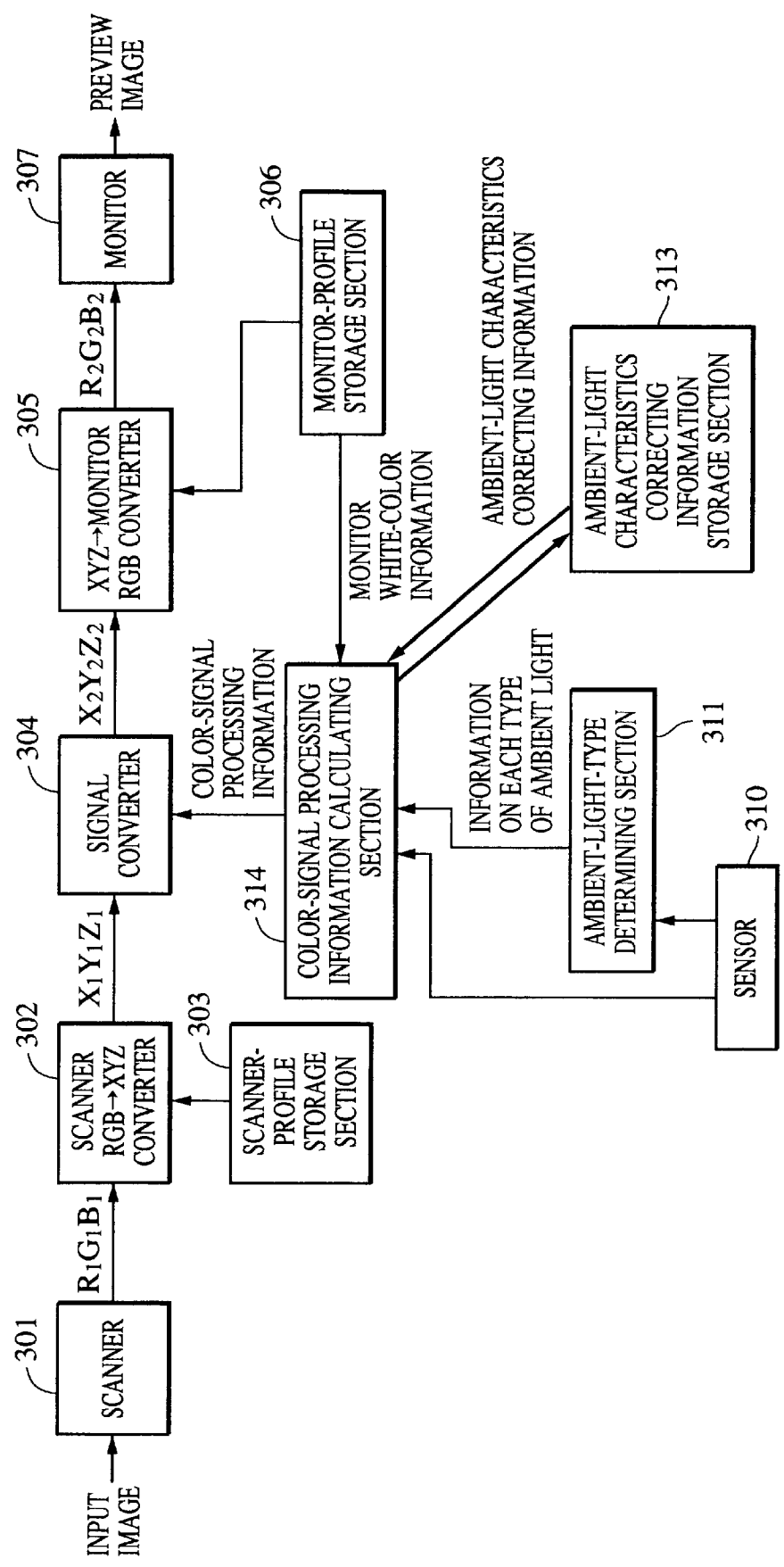
FIG. 3 is a block diagram illustrating a second embodiment of the present invention.

A description is now given of another embodiment constructed with the addition of a color-signal processing information calculating section 314 as part of the system, as illustrated in FIG. 3. In this embodiment, color-signal processing information is not obtained in advance, but is calculated in the calculating section 314 according to the ambient-light information obtained by the sensor 310. This calculation is performed using the following matrix calculations which have been described as the method for determining the color-signal conversion matrix in the first embodiment.

$$XYZ12XYZ2 = M^{-1}\cdot D\cdot M\cdot CR \quad (6)$$

$$D = \begin{bmatrix} \frac{R_w}{R_{wI}} & 0 & 0 \\ 0 & \frac{G_w}{G_{wI}} & 0 \\ 0 & 0 & \frac{B_w}{B_{wI}} \end{bmatrix}$$

$$\begin{bmatrix} R_{wI} \\ G_{wI} \\ B_{wI} \end{bmatrix} = M \begin{bmatrix} X_{wI} \\ Y_{wI} \\ Z_{wI} \end{bmatrix}$$

$$\begin{bmatrix} R_w \\ G_w \\ B_w \end{bmatrix} = M \begin{bmatrix} X_w \\ Y_w \\ Z_w \end{bmatrix}$$

Figure 6:
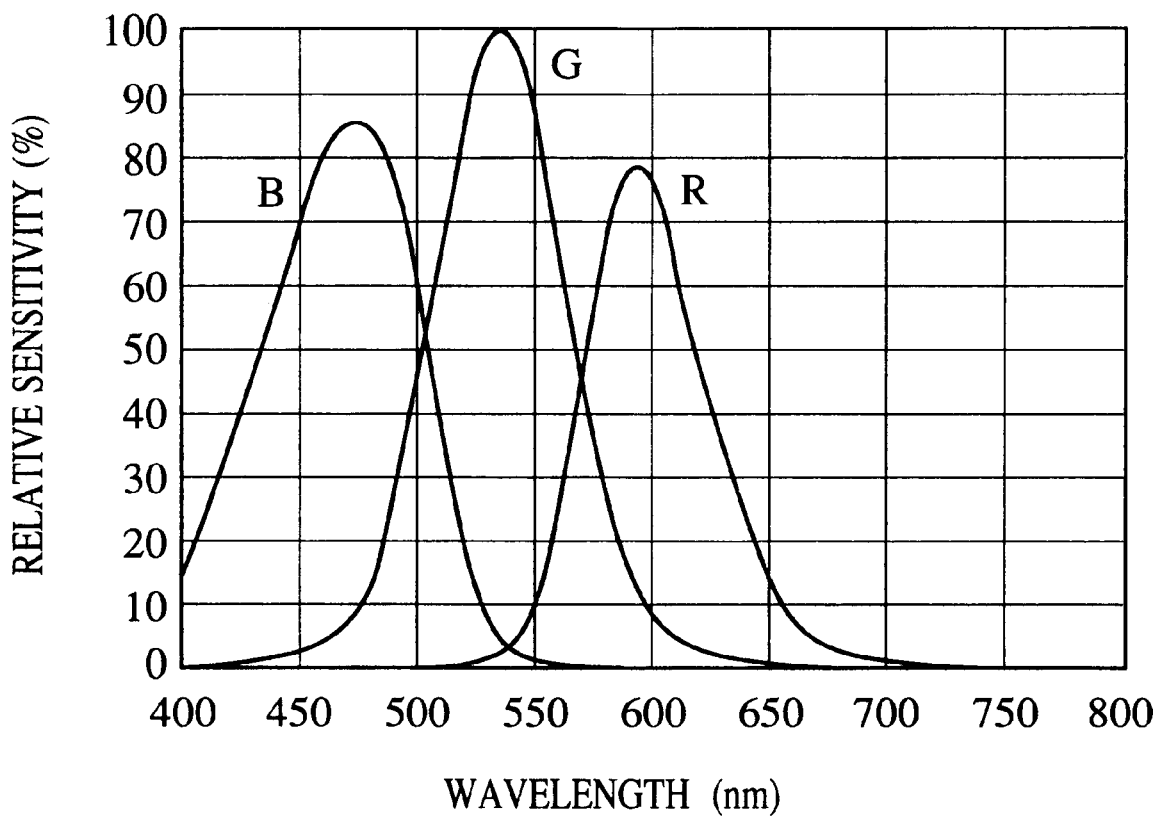
FIG. 6 illustrates the spectral sensitivity characteristics of three sensors used in an embodiment of the present invention.

The above-described matrix M functions to convert the tristimulus values XYZ expressed by the CIEXYZ colorimetric system into the response values RGB associated with the level of human eye receptors (cones). $X_{W1}Y_{W1}Z_{W1}$ depict the tristimulus values of ambient light (white color under image-observing environment). $X_WY_WZ_W$, which indicate the tristimulus values of the reference white, are determined using the above tristimulus values $X_{W1}Y_{W1}Z_{W1}$ of the ambient light and the tristimulus values $X_{W2}Y_{W2}Z_{W2}$ of the monitor white color according to the following equations:

$$X_W=(1-s)\cdot X_{W1}+s\cdot X_{W2}$$

$$Y_W=(1-s)\cdot Y_{W1}+s\cdot Y_{W2}$$

$$Z_W=(1-s)\cdot Z_{W1}+s\cdot Z_{W2}$$

where s represents parameters indicating the influence of the monitor white and the environment white upon the reference white. The tristimulus values of the ambient light and the tristimulus values of the monitor white color may be measured with a colorimeter, such as a color-luminance meter for input into the system. In this embodiment, however, the values obtained in the sensor 301 are used as the tristimulus values of the ambient light. The sensor 301 is thus constructed to output the ambient-light information as the tristimulus values $X_{W0}Y_{W0}Z_{W0}$. The tristimulus values $X_{W0}Y_{W0}Z_{W0}$ represent the color of the ambient light (white). The circuitry of the apparatus in this embodiment is constructed of three optical sensors exhibiting different spectral sensitivity characteristics, as illustrated in FIG. 6. The outputs $R_{sO}G_{sO}B_{sO}$ in accordance with the respective characteristics are thus obtained from the three optical sensors.

Figure 7:
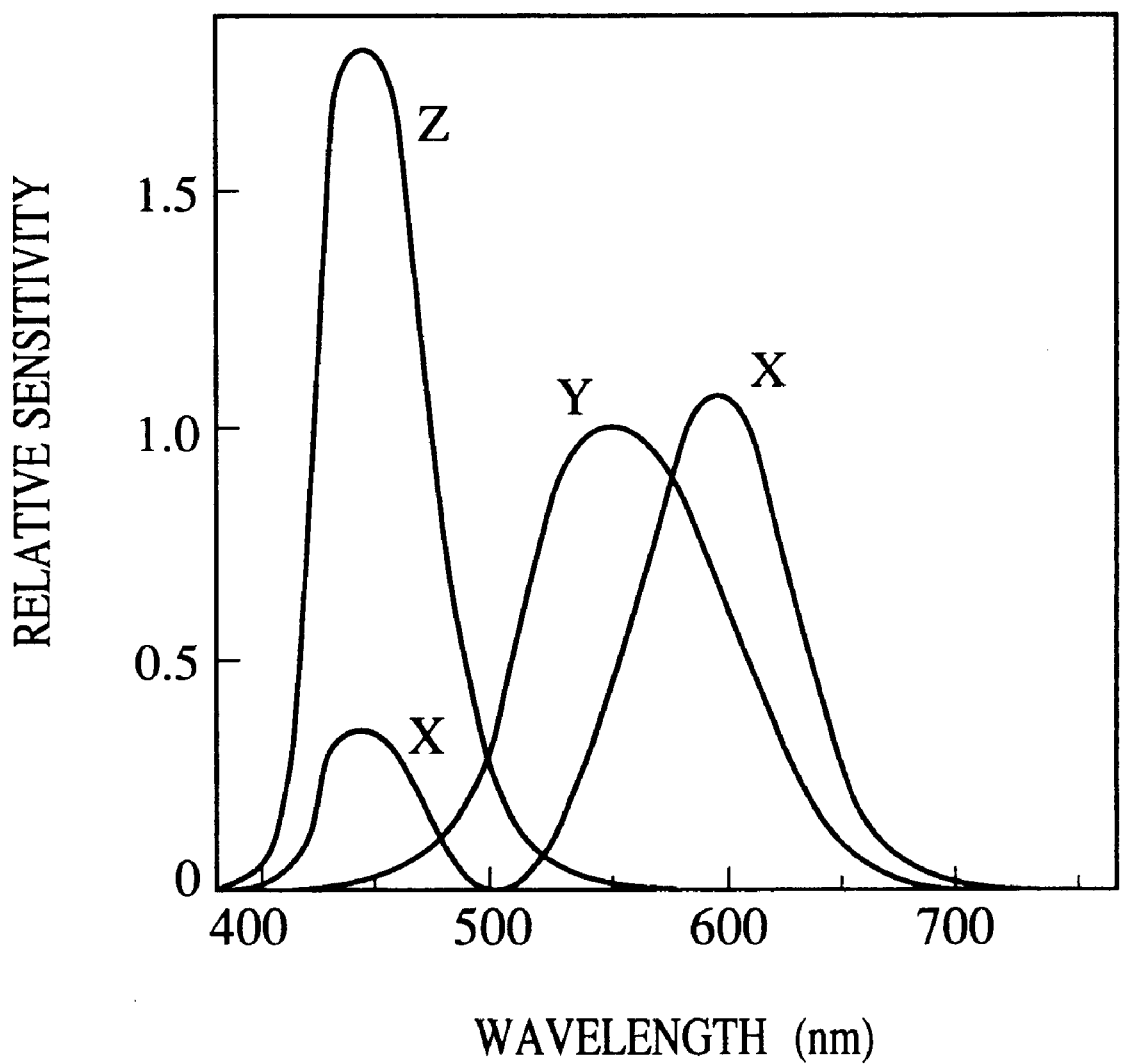
FIG. 7 illustrates the spectral sensitivity characteristics for obtaining the tristimulus values XYZ.

The spectral sensitivity characteristics for obtaining the tristimulus values XYZ are indicated as shown in FIG. 7, and are different from the characteristics (FIG. 6) of the sensors used in this apparatus. Accordingly, conversion is required from the sensor outputs $R_{SO}G_{SO}B_{SO}$ to the tristimulus values $X_{WO}Y_{WO}Z_{WO}$. In this embodiment, the conversion is performed with the use of a 3×3 matrix $MTX_{sensor}$ according to the following equation.

$$\begin{bmatrix} X_{WO} \\ Y_{WO} \\ Z_{WO} \end{bmatrix} = MTX_{sensor} \begin{bmatrix} R_{SO} \\ G_{SO} \\ B_{SO} \end{bmatrix} \quad (7)$$

The above-described matrix calculation is performed in a digital signal processing circuit contained in the apparatus.

The matrix CR is employed to convert the color signals (XYZ) expressed using a standard color space (a standard light source, such as D65 or D50, used in a standard color space) into color signals (X'Y'Z') produced considering the characteristics (spectral characteristics, color rendering, and so on) of a light source (ambient light) used when an observation is made. A 3×3 matrix is used as the matrix CR in this embodiment. The color signals (X'Y'Z') produced in consideration of the characteristics of the light source are converted using the matrix CR from the color signals (XYZ) indicated by a standard color space according to the following equation.

$$\begin{bmatrix} X' \\ Y' \\ Z' \end{bmatrix} = CR \begin{bmatrix} X \\ Y \\ Z \end{bmatrix} \quad (8)$$

The actual coefficients of the matrix CR are determined, based on data representing the measurements of the tristimulus values under a certain type of illumination light and the color signals (the tristimulus values) expressed with a standard color space, by optimizing the coefficients according to the damped least squares method using a test chart formed of 77-color patches, as shown in FIG. 2. Alternatively, the tristimulus values under illumination light may be determined based on the spectral reflectance factor of the 77-color patches measured with a spectrophotometer and the spectral intensity distribution of the illumination light measured with a spectral luminance meter. Then, the actual coefficients of the matrix CR may be obtained according to the optimization method in a manner similar to the above method. The above-described measurement means are suitably selected as required.

The matrix CR produced in the above manner is stored as ambient-light-characteristic correcting information in an ambient-light-characteristic correcting information storage section 313. The matrix CR used for calculation is used in the following manner: the type of ambient light is determined, based on the ambient-light information obtained by the sensor 310, in an ambient-light-type determining section 311 in the manner discussed in the first embodiment, and the corresponding ambient-light-characteristic correcting information, i.e., the matrix CR, is selected using the information on the determined type of ambient light from the storage section 313. The other operations are similar to those of the first embodiment.

In this embodiment, color signal processing information used in the signal converter 304 is obtained by making calculations in the color-signal processing information calculating section 314. With this construction, it is only essential that calculations be made to obtain color-signal processing information as ambient-light-characteristic correcting information which does not depend upon the monitor or chromaticity and luminance of the ambient light. Hence, the number of types of color-signal processing information required to be obtained and stored in advance is less than in the first embodiment.

(Third Embodiment)

Figure 8:
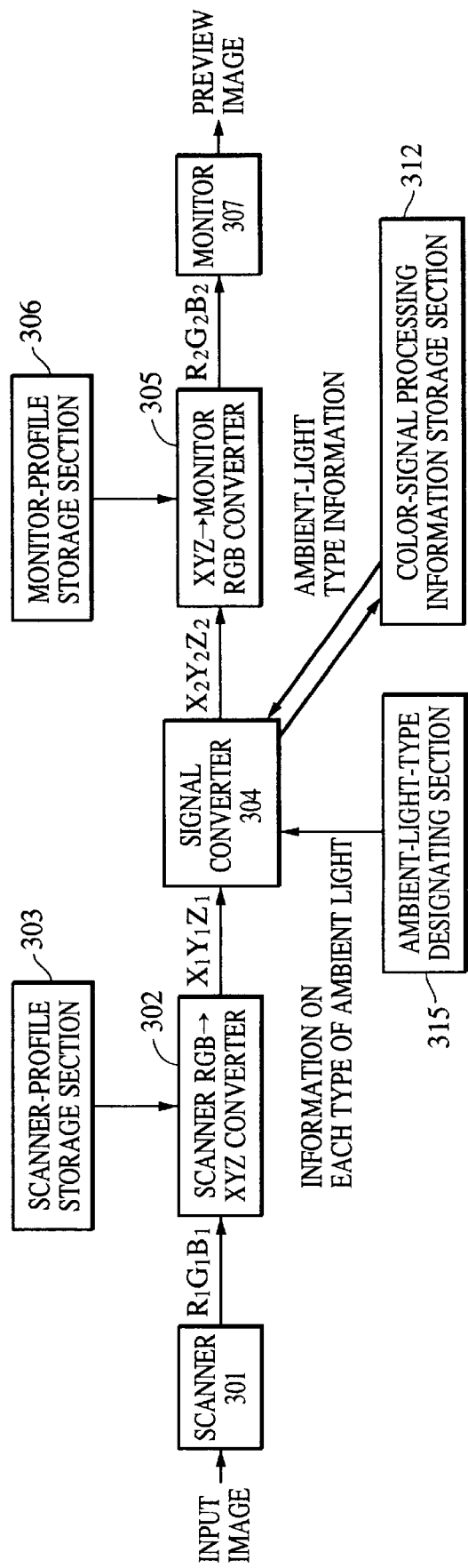
FIG. 8 is a block diagram illustrating a third embodiment of the present invention.

A description is now given of a third embodiment, as illustrated in FIG. 8, constructed with the addition of an ambient-light-type designating section 315 as part of the system.

The basic operation of this embodiment is substantially similar to the operation of the first embodiment. In the first embodiment, the ambient-light type is automatically determined, based on the ambient-light information obtained in the sensor 310, in the ambient-light type determining section 311 contained within the system. In this embodiment, however, a provision of the ambient-light type designating section 315 makes it possible to directly designate the type of ambient light. This avoids recognition errors in the type of ambient light. It is also possible to display on the monitor, images to be observed under ambient light other than the current environmental conditions. The types of ambient light may be specified by selecting from the ambient-light numbers listed on the display screen with a mouse or a keyboard. In addition, the color temperatures and spectral characteristics may be displayed on the screen as a reference for designating the type of ambient light.

According to the aforedescribed embodiments, a reference white color is determined, considering all of the white colors detectable under observing environments. Color signal processing is then performed using this reference white color so as to achieve color-appearance matching between an image on the monitor and a printed article. In order to implement the above color-appearance matching, sufficient consideration is given to the characteristics (spectral characteristics, color rendering, etc.) of ambient light when color signals are converted. More specifically, information (chromaticity values, XYZ tristimulus values, etc.) concerning the white color (white paper color) detected under illumination light (environmental light) is determined from information (chromaticity values, color temperatures, spectral intensity (illuminance), and so on) of the light. Additionally, information (for example, a two-dimensional matrix) for converting other colors is obtained. Then, color-signal conversion is performed based on the above-described overall information.

According to the foregoing embodiments, color signals are converted with high precision in accordance with the ambient light of various light sources, thereby fulfilling highly-precise color-appearance matching between a monitor image and a printed article.

In the aforedescribed embodiments, the theory by Von Kreis is used as the chromatic-adaptation prediction theory. However, other theories may be applicable.

The present invention may be applicable to various constructions based on hardware and the corresponding sequence processing. The sequence processing may be, for example, described logically or expressed in software. Alternatively, it may be formed into an algorithm within the spirit and scope of the present invention, and the present invention may be applicable as hardware or an apparatus according to the above algorithm.

Further, the present invention may be used in a copying machine or a printer loaded with a preview function which serves to display a print preview image on a monitor. The present invention is also applicable to a color management system for use in an image processing apparatus for performing various types of color signal conversions, such as for various types of input/output devices. Additionally, a look-up table may be formed based on XYZ1 2XYZ2, and chromatic-adaptation conversion processing in the signal converter 304 may be performed based on this table.

The present invention may be applicable to a system comprised of a plurality of devices (for example, a host computer, an interface, a reader, and a printer) or formed of only one device (for example, a copying machine or a facsimile machine).

Also, the following modification may be made to fulfil the above-noted functions loaded with the foregoing embodiments of the present invention. Software program codes for implementing the above functions may be installed in a computer within an apparatus connected to the various devices or in a computer within the system. Then, the various devices may be operated according to the program stored in the computer (a CPU or an MPU) within the system or the apparatus.

In this case, since the software program codes per se can fulfil the functions of the aforedescribed embodiments, the program codes per se and means for supplying the program codes to a computer, for example, a storage medium in which the program codes are stored, can constitute the present invention. The storage mediums for storing such program codes may include floppy disks, hard disks, optical disks, magneto-optical disks, CD-ROMs, magnetic tape, non-volatile memory cards, and ROMs.

Needless to say the program codes installed in the computer may be included in the present invention if the functions of the aforedescribed embodiments are implemented by operating the program codes in cooperation with an operating system (OS) run on a computer or with another application software program.

Further, the program codes may be naturally included in the present invention if the functions of the above-described embodiments are achieved in the following manner. Namely, the program codes are stored in a memory provided for a feature expansion board of a computer or a feature expansion unit connected to a computer, and then, a CPU or an MPU stored within the feature expansion board or the feature expansion unit completely or partially executes actual processing based on the program codes.

As is clearly understood from the foregoing description, the present invention offers the following advantages. Color-appearance matching of an output image to an input image is achieved regardless of ambient light (observing light). Further, highly-precise color-appearance matching of an output image to an input image is fulfilled by performing color conversion considering the characteristics, such as color rendering, of ambient light.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing method of performing color processing wherein color image data indicated by means of a color system which is independent of device characteristics are processed, depending on a property of environment light, said method comprising the steps of:

inputting information of the environment light;

performing correction of first image data to second image data in accordance with a color rendering property of the environment light, based on the information of the environment light; and performing conversion of the second image data to third image data in accordance with white information of the environment light, based on the information of the environment light.

2. An image processing method according to claim 1, wherein said color system is a XYZ color system.

3. An image processing method according to claim 1, wherein said correction of image data is performed using a 3×3 matrix.

4. An image processing method according to claim 1, wherein said correction and said conversion are performed together by the table in accordance with the condition of said correction and said conversion.

5. An image processing method comprising the steps of:

performing correction of image data in accordance with a color rendering property of environment light; and performing conversion of the corrected image data in accordance with white information of the environment light, wherein said conversion comprises the step of predicting chromatic adaptation based on the white information of the environment light and a reference white color determined when an observation is made.

6. An image processing method according to claim 5, wherein said reference white color is generated from the white information of the environment light and a white color of an output device.

7. A recording medium for storing a program for implementing an image processing method of performing color processing wherein color image data indicated by means of a color system which is independent of device characteristics are processed, depending on a property of environment light, said method comprising the step of:

performing correction of first image data to second image data in accordance with a color rendering property of the environment light; and performing conversion of the second image data to third image data in accordance with white information of the environment light.

8. An image precessing apparatus for performing color processing wherein color image data indicated by means of a color system which is independent of device characteristic are processed, depending on a rpoperty of environment light, comprising:

means for performing correction of first image data to second image data in accordance with a color rendering property of the environment light; and means for performing conversion of the second image data to third image data in accordance with white information of the environment light.

9. An image processing apparatus according to claim 8, said apparatus further comprising:

selecting means for selecting, based on the information regarding the environment light, correction data to be used by said correction means.

10. An image processing apparatus according to claim 9, wherein said inputting means comprises a sensor.

11. An image processing apparatus for performing color processing wherein color image data indicated by means of a color system which is independent of device characteristics are processed, depending on a property of environment light, said method comprising the steps of:

input means for inputting information of the environment light;

correction means for performing correction of first image data to second image data in accordance with a color rendering property of the environment light, based on the information of the environment light; and conversion means for performing conversion of the second image data to third image data in accordance with white information of the environment light, based on the information of the environment light.

12. A computer readable medium having recorded thereon codes for implementing a computer implementable image processing method of performing color processing wherein color image data indicated by means of a color system which is independent of device characteristics are processed, depending on a property of environment light, said method comprising the steps of:

inputting information of the environment light;

performing correction of first image data to second image data in accordance with a color rendering property of the environment light, based on the information of the environment light; and performing conversion of the second image data to third image data in accordance with white information of the environment light, based on the information of the environment light.

13. An image processing method for converting input image data into color image data indicated by means of a color system which is independent of device, said method comprising the steps of:

inputting information relating to ambient light; and performing a conversion process on the color image data based on the information input in said inputting step, wherein the conversion process includes correction in accordance with a color rendering property of the ambient light and conversion in accordance with white information of the ambient light.

14. A method according to claim 13, further comprising the step of converting the converted color image data into color data depending on a destination device.

15. A recording medium, storing in computer-readable form, a program for causing execution of an image processing method for converting input image data into color image data indicated by means of a color system which is independent of device, said method comprising the steps of:

inputting information relating to ambient light; and performing a conversion process on the color image data based on the information input step, wherein the conversion process includes correction in accordance with a color rendering property of the ambient light and conversion in accordance with white information of the ambient light.

16. A record medium according medium according to claim 15, wherein said method further comprises the step of converting the converted color image data into color data depending on a destination device.

* * * * *

UNITED STATES PATENT AND TRADEMARK OFFICE
CERTIFICATE OF CORRECTION

PATENT NO. : 6,453,066 B1
DATED : September 17, 2002
INVENTOR(S) : Yoshinobu Shiraiwa et al.

It is certified that error appears in the above-identified patent and that said Letters Patent is hereby corrected as shown below:

<u>Title page,</u>
Insert -- [74] *Attorney, Agent, or Firm* — Fitzpatrick, Cella, Harper & Scinto --.
Item [57], ABSTRACT,
Line 5, "image" should read -- image. -- and
Line 6, "image," should read -- image --.

<u>Drawings,</u>
Sheet 4, FIG. 4, "RADIENT" should read -- RADIANT --.
Sheet 5, FIG. 5, "(DOTTEL" should read -- (DOTTED -- and
               "RADIENT" should read -- RADIANT --.

<u>Column 4,</u>
Line 24, "ing in" should read -- ing is described in --.

<u>Column 7,</u>
Line 8, "calorimeter," should read -- colorimeter, --.

<u>Column 11,</u>
Line 31, "say" should read -- say, --.

<u>Column 12,</u>
Line 13, "a" should read -- an --;
Line 40, "step" should read -- steps --;
Line 47, "precessing" should read -- processing --; and
Line 51, "rpoperty" should read -- property --.

<u>Column 13,</u>
Line 3, "method" should read -- apparatus --.

UNITED STATES PATENT AND TRADEMARK OFFICE
CERTIFICATE OF CORRECTION

PATENT NO.     : 6,453,066 B1
DATED          : September 17, 2002
INVENTOR(S)    : Yoshinobu Shiraiwa et al.

It is certified that error appears in the above-identified patent and that said Letters Patent is hereby corrected as shown below:

<u>Column 14,</u>
Line 21, "input step," should read -- input in said inputting step, --.

Signed and Sealed this

Thirteenth Day of May, 2003

JAMES E. ROGAN
*Director of the United States Patent and Trademark Office*